July 28, 1964 E. E. NEWHALL 3,142,828

MAGNETIC MEMORY ARRAY

Filed Dec. 30, 1960 4 Sheets-Sheet 1

INVENTOR
E. E. NEWHALL
BY
William H. Kamtra
ATTORNEY

July 28, 1964 E. E. NEWHALL 3,142,828

MAGNETIC MEMORY ARRAY

Filed Dec. 30, 1960 4 Sheets-Sheet 2

INVENTOR
E. E. NEWHALL
BY William H. Hamstra
ATTORNEY

July 28, 1964 E. E. NEWHALL 3,142,828

MAGNETIC MEMORY ARRAY

Filed Dec. 30, 1960 4 Sheets-Sheet 3

INVENTOR
E. E. NEWHALL
BY William H. Kamstra
ATTORNEY

July 28, 1964 E. E. NEWHALL 3,142,828

MAGNETIC MEMORY ARRAY

Filed Dec. 30, 1960 4 Sheets-Sheet 4

INVENTOR
E. E. NEWHALL
BY *William H. Kamstra*
ATTORNEY

United States Patent Office 3,142,828

Patented July 28, 1964

3,142,828

MAGNETIC MEMORY ARRAY

Edmunde E. Newhall, Brookside, N.J., assignor to Bell Telephone Laboratories, Incorporated, New York, N.Y., a corporation of New York Filed Dec. 30, 1960, Ser. No. 79,688
24 Claims. (Cl. 340—174)

Figure 1:
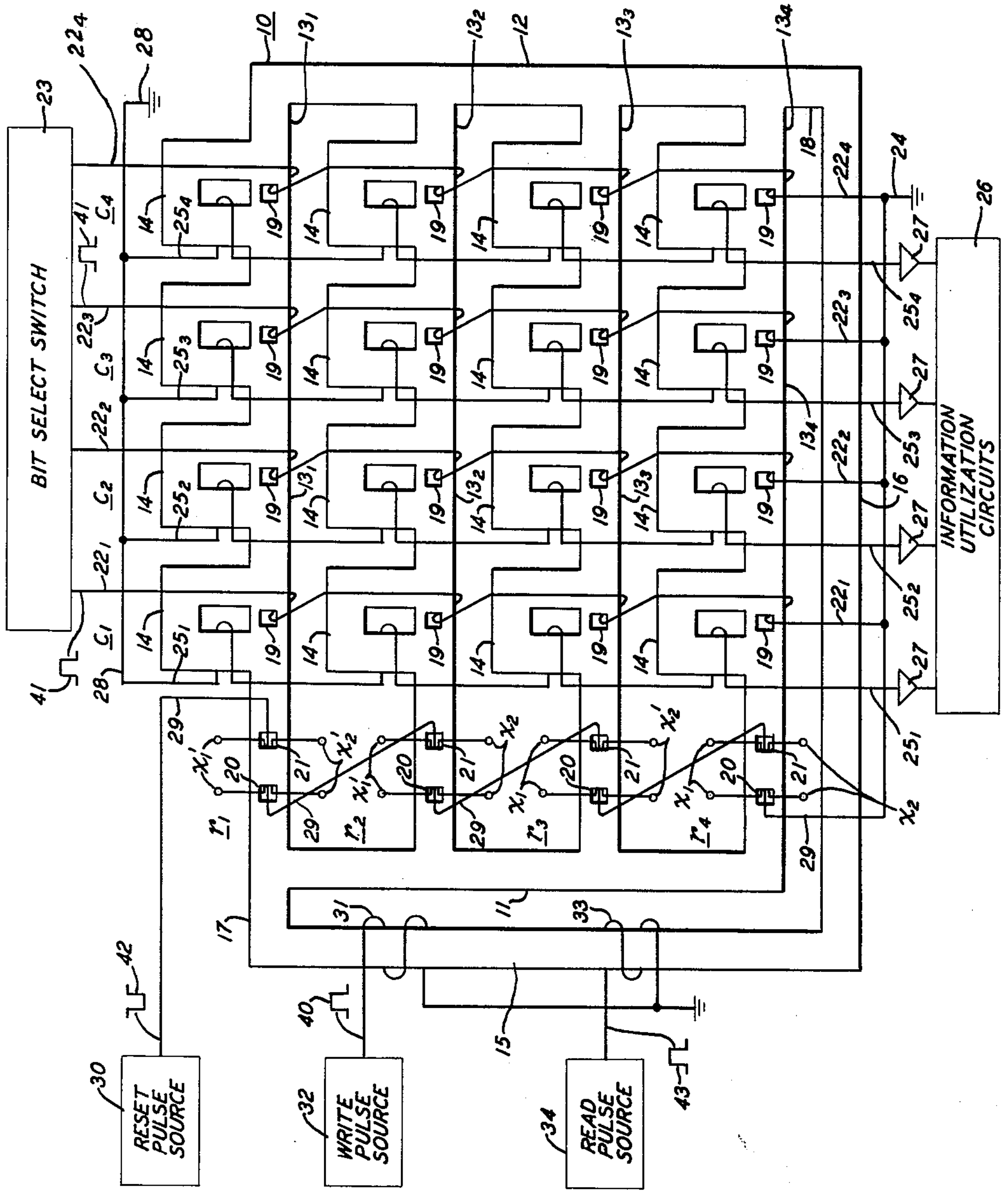

This invention relates to magnetic memory circuits, and more particularly to such circuits employing multi-apertured magnetic elements as the basic information storage addresses.

Coordinate memory arrays having individual magnetic information storage elements at the crosspoints of row and column access conductors have been extensively employed in information handling and data processing systems. Binary information bits are stored in the individual elements in the form of one or the other remanent magnetic state as is well known in the art. By means of coincident current access techniques particular information addresses are selected in the memory array for writing into those addresses the binary bits which are to be stored therein. In one well known coordinate memory array having conventional square loop toroidal cores at the crosspoints, the row and column access conductors defining, in the array, the cores which are to contain the input binary bits are each energized by half-select current pulses. A single half-select current pulse is in itself of insufficient magnitude to cause a complete flux excursion in a core from one remanent point on its loop to the other. However, as is also well known, the combined magnetomotive forces generated by two such half-select current pulses cause a complete flux switching in the core to which the forces are applied. The magnetic state to which the core is so driven is then representative of the binary bit to be stored therein. Two half-select current pulses thus coincide in time to cause a single complete flux switching in the single flux path toroidal core.

Multi-apertured magnetic elements have also been employed with particular advantages as the individual storage elements and memory arrays employing such elements have also become familiar in the prior art. Such elements present a plurality of flux paths in their structures and, by appropriately steering flux through the various paths presented therein, an information storage and readout function may be advantageously achieved. Such an arrangement is described, for example, in the copending application of U. F. Gianola, Serial No. 850,145, filed November 2, 1959, now Patent No. 3,040,305, issued June 19, 1962. In such arrangements a flux generated in particular paths or legs of the storage element coincidently with a current pulse applied to the element achieves the flux switching required to control the selective writing and reading of the binary bits stored in the element. Thus, although coincident currents are still required to generate the steered flux and provide other control functions to obtain access to particular storage elements of the coordinate array, the foregoing mode of access may for convenience be thought of as a coincident flux and current access operation. In such known, multi-apertured arrangements each of the individual storage elements is separate and physically distinct from each of the others and is associated with adjacent elements only by connecting or common coupling conductors. Thus, flux changes in portions of one element in the optimum case have no direct effect on the magnetic state of its adjacent or other elements.

In many coincident current arrangements where the combined effect of two half-select current pulses is required to accomplish the flux switching, a rather rigid limit is imposed on the magnitude of the half-select current pulses. The half-select current pulses singly must be of a magnitude to cause only a negligible flux excursion in the core storage element, yet, combined, the magnitude must be sufficient to cause a complete flux reversal from one remanent point to substantial saturation in the opposite direction. These limitations on the half-select current pulses frequently permit only narrow operational margins during the flux switching operations.

According to the principles of the present invention, it is an object thereof to integrate each of the individual magnetic storage elements in a single magnetic structure.

It is another object of this invention to provide a coordinate magnetic memory array in which access is had to individual magnetic storage elements by a single drive magnetic flux steered to selected elements by means of flux paths connecting each of the elements of the array with each of the other elements of the array.

It is still another object of this invention to provide a new and novel coordinate magnetic memory array which is more readily fabricated and therefore more economical than memory arrays heretofore known.

A further object of this invention is to eliminate restrictive limitations on the magnitude of access currents applied to the individual storage elements of a coordinate memory array during writing or reading operations.

The foregoing and other objects of this invention are achieved in one specific illustrative embodiment thereof comprising a one-piece magnetic plate structure of a ferrite material having substantially rectangular hysteresis characteristics and so apertured as to present a coordinate array of individual magnetic storage elements. The plate presents a pair of side rails having a plurality of transverse cross legs integrally disposed therebetween. Each of the cross legs in turn has integral therewith a plurality of protruding U-shaped members each of which presents a bypass for any magnetic flux which may be induced along a cross leg of the plate structure. The U-shaped members together with the portion of the cross leg completing a flux loop therewith comprise the individual magnetic storage elements, the legs of the members opposite the portions of the cross legs of the plate serving as the specific information storage cells.

Adjacent one of the side rails of the plate and running substantially parallel therewith and also adjacent an end cross leg and also running substantially parallel with the latter leg, is an L-shaped flux drive leg. The L-shaped drive leg is integrally connected with the rectangular plate structure at diagonally opposite corners thereof. In the structure thus far described, it will be apparent that a plurality of flux paths are presented through the cross legs and connecting side rails which, when traced through the common L-shaped drive leg, are equal in length. The structure thus far described is also advantageously arranged on a word-organized basis, each of the cross legs having integral therewith the storage elements which are to contain the binary bits making up a binary word. Corresponding elements of the cross legs then contain the corresponding binary bits of the plurality of binary words stored in the memory.

A binary word of particular information bits is written into a selected word row of storage elements by a write flux induced in the common L-shaped drive leg. This write flux will be closed through the cross leg defining the selected word row if the paths through each of the cross legs defining unselected word rows are blocked to the write flux. Word row select windings coupled to the cross legs are selectively energized to accomplish the selective blocking operation. The write flux, in tending to close through the shortest possible path, that is, the path of least reluctance, will bypass the U-shaped storage elements and pass directly along the selected cross leg to the connecting side rail except in the case of storage elements of the selected word row which are to contain binary "1's." In the latter cases, the write flux is diverted through the U-shaped bypass members to cause a flux switching in the address legs representative of the binary "1's." Bit select windings coupled to the cross legs at each of the U-shaped members and serially connected to comprise the column access conductors of the array are selectively energized to accomplish the bit selecting flux diverting operation.

After each of the information storage legs of the storage elements to contain the binary "1's" has been magnetically set, the write flux is advantageously withdrawn by a reset current pulse applied to each of the cross legs. The L-shaped drive leg is now available for the induction of a subsequent write flux for writing information into another word row of storage elements. The binary bits written into the selected information addresses are left undisturbed by the flux withdrawal. Readout is accomplished by reversing the direction of the drive flux in the L-shaped drive leg. The read flux thus induced is steered through selected word row cross legs in the same manner as was the oppositely directed write flux. However, during a read operation the read flux is steered directly along a selected cross leg without diversion around the U-shaped storage elements. The flux reorientations caused in the information legs of the storage elements by the read flux passing through the cross leg generate output signals in sensing leads coupled to the storage elements. These output signals are conventionally indicative of the binary information bits stored in the word row interrogated.

A coordinate memory array thus generally described is advantageously formed of a single sheet or plate of ferrite material, which array is obviously more easily handled during wiring operations. Further, such a structure readily lends itself to the fabrication of multiplane memory arrays since a plurality of congruent plates may be conveniently stacked and, where possible, common energizing windings employed. Since all of the currents applied to the memory structure perform only flux induction and flux holding functions and no coincidence of currents having particular ceiling limitations occurs, no upper limit is advantageously imposed on the current required in the operation of this invention.

Accordingly, specific features of this invention include a single, one-piece magnetic plate structure having integral therein the individual magnetic storage elements making up a coordinate memory array.

Another feature of this invention is a single flux drive leg in which is induced, for both writing and reading functions, a drive flux which is selectively steered, via connecting portions of a single magnetic plate, to the information address legs of individual magnetic storage elements.

Still another feature of the one-piece integrated magnetic memory array of this invention is a novel gating means for selectively blocking particular flux paths presented by word row cross legs to a drive flux and also, by blocking paths within the cross legs, diverting the drive flux to information addresses in storage elements on the cross legs. By controlling the direction of a remanent flux around small apertures at selected points on the cross legs, the flux path presented by the cross leg may be effectively denied to the drive flux tending to find closure therethrough.

It is another feature of this invention that the cross legs of a one-piece magnetic structure having integral therewith the magnetic storage elements containing the binary addresses of binary word rows are selectively closed to a drive flux during writing and reading operations by gating means energized responsive to binary coded input signals. By applying the input signals in accordance with a binary code identifying one of the cross legs a word address may be decoded within the memory array itself for writing and reading purposes.

In accordance with still another feature of this invention an alternate storage element arrangement is provided which advantageously combines the only reset operation required with a write phase such that bit select current pulses applied to columns of storage elements cooperate with the reset flux reorientations to induce particular information representative states in the storage elements of a selected word row. Advantageously also word row selection for both the write and read phase of operation is accomplished at one time during the read phase. In this arrangement, although the bit select current pulses need only be of sufficient magnitude to disturb the magnetic equilibrium of the storage elements, no upper limit is imposed on the magnitudes of these select currents.

Figure 2A:
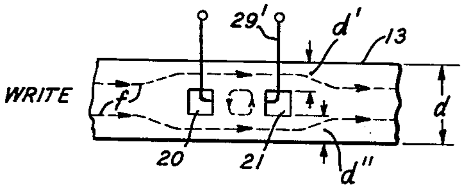
Figure 2B:
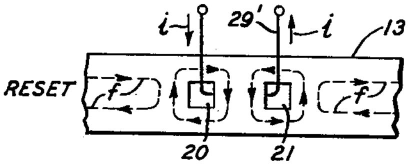
Figure 3:
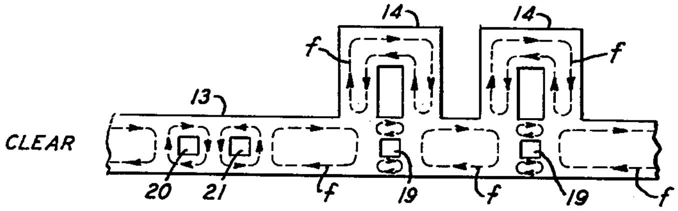
Figure 4A:
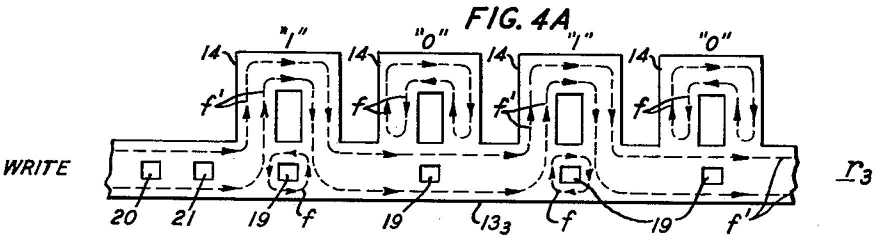
Figure 4B:
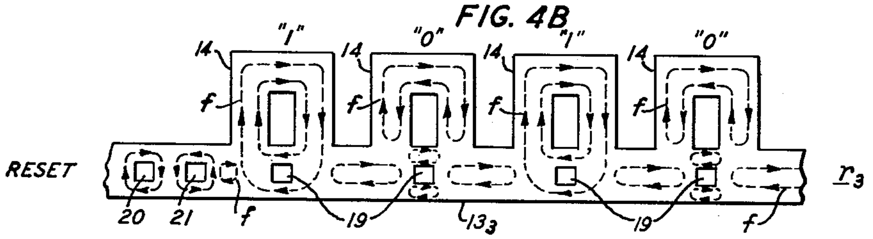
Figure 4C:
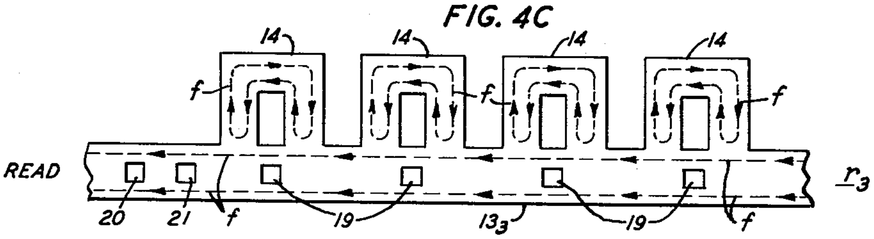
Figure 5:
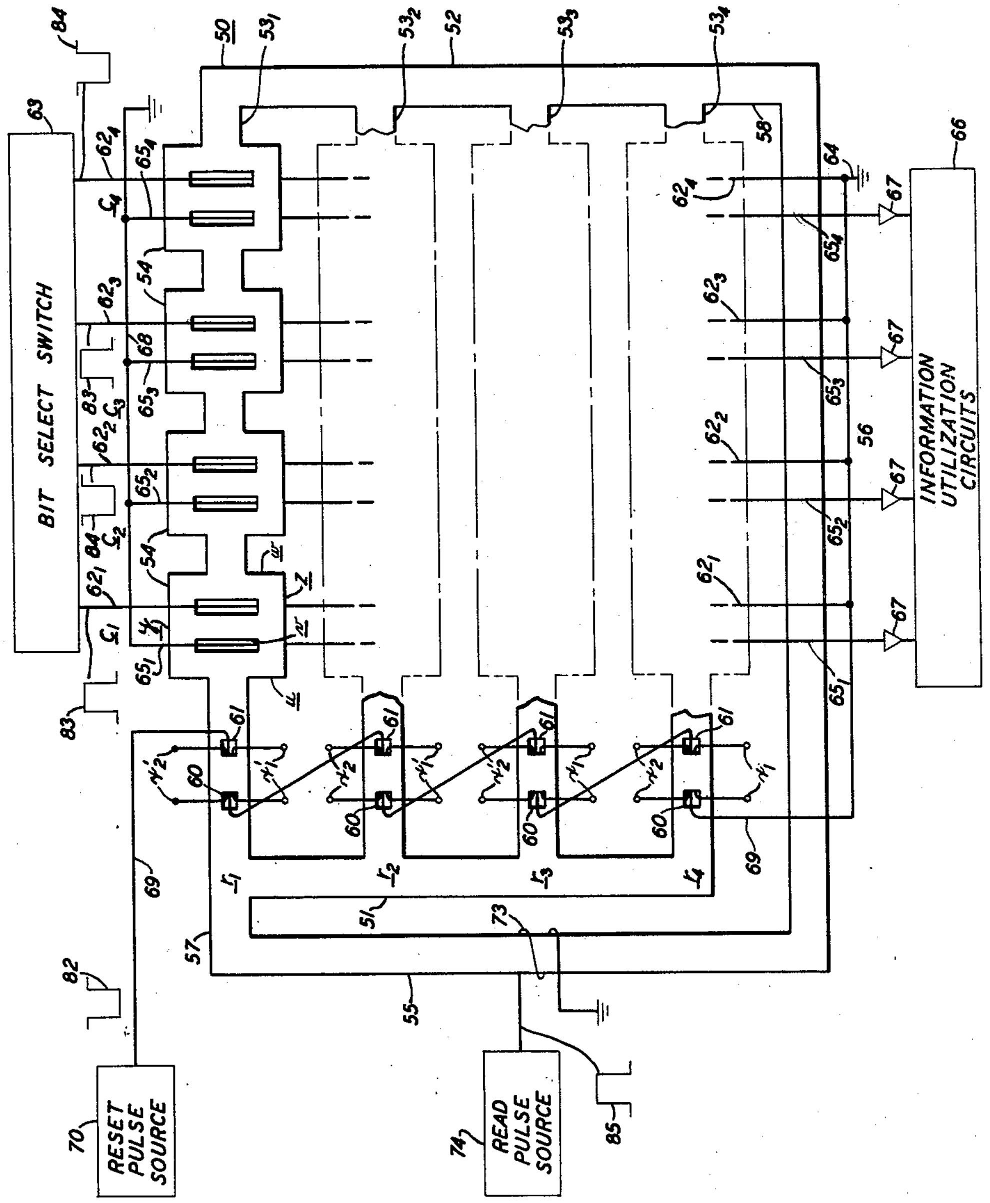
Figure 6A:
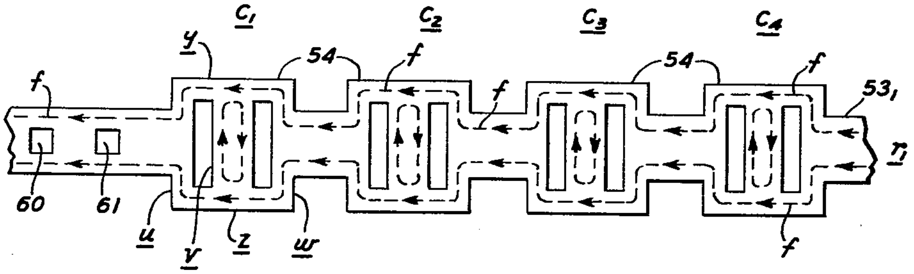
Figure 6B:
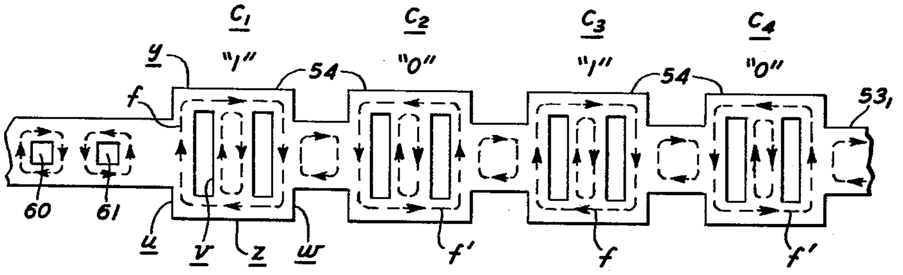
Figure 6C:
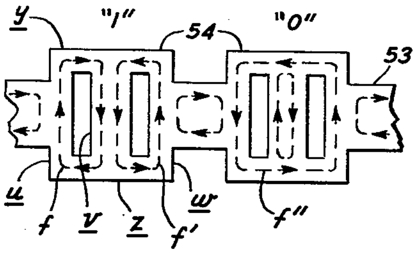

The foregoing and other objects and features of this invention will be better understood from a consideration of a detailed description of illustrative embodiments of this invention which follows when taken in conjunction with the acompanying drawing in which:

FIG. 1 depicts a specific illustrative memory array according to the principles of this invention showing the integrated memory structure in plan view;

FIGS. 2A and 2B each show a portion of a cross leg of the integrated magnetic structure of the memory array of FIG. 1 for purposes of describing the novel flux gating means employed in this invention;

FIG. 3 shows another portion of a cross leg of the magnetic structure of the memory array of FIG. 1 including two of the information storage members formed thereon for purposes of representing the magnetic state thereof during an operative phase of the invention;

FIGS. 4A, 4B, and 4C each show a portion of a cross leg of the magnetic structure of the memory array of FIG. 1 with the information storage members thereon for purposes of representing various magnetic states thereof during other operative phases of the invention;

FIG. 5 depicts another specific illustrative memory array according to the principles of this invention showing the integrated memory structure in plan view; and FIGS. 6A, 6B, and 6C each show a portion of a cross leg of the memory array of FIG. 5 for purposes of representing various magnetic states thereof during particular operative phases of the latter embodiment.

One specific illustrative embodiment of this invention is depicted in FIG. 1 and comprises a magnetic plate structure 10 apertured to present a plurality of flux steering legs in a substantially rectangular arrangement. The plate structure 10 is fabricated of any well known ferrite material exhibiting substantially rectangular hysteresis characteristics and is specifically apertured to present a pair of side rails 11 and 12 having a plurality of cross legs $13_1$ through $13_4$ transversely arranged therebetween. The cross legs 13 in turn are parallelly arranged and each of the cross legs 13 has a plurality of inverted U-shaped members 14 integrally formed thereon. Each of the members 14, together with the portion of the cross legs 13 measured off thereby, comprises an individual information storage element, the storage elements being coordinately arranged in rows and columns. In the U-shaped members 14, the cross leg parallel to a cross leg 13 specifically comprises the information storage cell in which information significant flux switchings are to take place as will be described in greater detail hereinafter. Advantageously, the specific memory array of FIG. 1 is word organized, the storage elements of a binary word being arranged in word rows along the cross legs, the binary bit addresses of the binary words being defined by the corresponding storage elements of the word rows. The rows and columns of information addresses are designated $r_1$ through $r_4$ and $c_1$ through $c_4$, respectively.

In addition to the legs described in the foregoing, the structure 10 has a flux drive section integral therewith comprising an L-shaped member made up of a drive leg 15 running parallel with the side rail 11 and a drive leg 16 running parallel with the cross leg $13_4$. The drive legs 15 and 16 are connected at diagonally opposite corners of the rectangle formed of the side rails 11 and 12 and cross legs $13_1$ and $13_4$ by means of bridging leg pieces 17 and 18, respectively. The elements and legs of the structure 10 are flux limited, that is the minimum cross-sectional area of each of these elements and legs so far described is substantially the same, for reasons which will become apparent hereinafter. Each of the cross legs 13 has a plurality of small flux control apertures 19 therein, each of the apertures 19 being located substantially in the center of the portion of the leg 13 measured off thereon by a U-shaped member 14. One aperture 19 is thus associated with each of the information storage elements of the memory array. Each of the cross legs 13 also has a pair of small flux control apertures 20 and 21 therein located between the side rail 11 and the first column $c_1$ of storage elements. The flux control apertures 19, 20, and 21 divide the cross legs 13 at these points into minor flux legs, the relative dimensions of which will be considered hereinafter.

Column conductors $22_1$ through $22_4$, associated with the columns of information addresses $c_1$ through $c_4$, respectively, thread the apertures 19 associated with the information storage elements of these columns and are inductively coupled to one of the minor flux legs defined by an aperture 19 of the cross legs 13. In the embodiment being described this coupling is to the lower minor leg in each case. The conductors 22 are each connected at one end to a bit select switch 23 and at the other end to a ground bus 24. Each of the storage elements of the colums $c_1$ through $c_4$ also has coupled to a vertical leg of the U-shaped member 14, a sensing winding, which windings are shown in FIG. 1 as the column sensing conductors $25_1$ through $25_4$ threading the apartures formed in the U-shaped members 14 and coupled to one of the vertical legs thereof. The column sensing conductors 25 are each connected at one end to information utilization circuits 26 through a detection amplifier means 27 and at the other end to a ground bus 28. A reset conductor winding 29 is serially threaded in one direction through the aperture 21 and in the opposite direction through the aperture 20 of each of the cross legs 13 and is connected at one end to the ground bus 24. The reset conductor 29 is connected at the other end to a reset pulse source 30. A write drive winding 31, inductively coupled in one sense to the flux drive leg 15, is connected between ground and a write pulse source 32, and a read drive winding 33, inductively coupled in the opposite sense to the drive leg 15, is connected between ground and a read pulse source 34.

In addition to the reset conductor winding 29, each of the aperture pairs 20 and 21 of the cross legs 13 has threaded therethrough in opposite directions a pair of address windings. Specifically the apertures 20 and 21 of the cross leg $13_1$ have threaded therethrough the address windings designated $x_1'$ and $x_2'$, the apertures 20 and 21 of the cross leg $13_2$ have threaded therethrough the address windings designated $x_1'$ and $x_2$, the apertures 20 and 21 of the cross legs $13_3$ have threaded therethrough the address windings $x_1$ and $x_2'$, and the apertures 20 and 21 of the cross leg $13_4$ have threaded therethrough the address windings $x_1$ and $x_2$. Each of the address windings is connected to a pulse source, not shown in the drawing, for controlling flux steering in the structure 10 in a manner which will be described hereinafter. The address windings are thus shown in the drawing only as being provided with terminals to which appropriate pulses may be applied. Each of the pulse sources and the bit select switch referred to in the foregoing general description may comprise electrical circuitry well known in the art and each of these circuits is readily envisioned by one skilled in the magnetic switching art. Accordingly these circuits are shown only in block symbol form in the drawing and are described only to the extent of describing the character of the pulses to be provided thereby. Similarly the detection amplifier means 27 may also comprise any suitable circuitry capable of raising output signals generated during the operation of the embodiment of FIG. 1 to levels required by the information handling system of which this invention may advantageously comprise a part. The information utilization circuits 26 may also comprise associated circuitry of such a system. Accordingly, these circuits are also shown generally in block symbol form since the details of these circuits are not essential to an understanding of the organization of this invention or its practice.

A write-read cycle of operation of the embodiment of FIG. 1 is accomplished in four phases; a write phase, a reset phase, a read phase, and another reset phase. In both the write and read phases of operation, a drive flux is induced in the drive leg 15, which drive flux is completed via the bridging piece 17, side rail 11, any one of the cross legs 13, side rail 12, the bridging piece 18, and the leg 16. In each of the cross legs 13, the drive flux may also take alternate paths as presented through the information legs of the members 14 and the portions of the cross legs 13 having the apertures 19 therein. Which of the cross leg paths and which of the paths presented within a particular cross leg are taken by the drive flux will be determined by the magnetic states of the minor paths into which these members are divided by the flux control apertures 20 and 21 and the flux control apertures 19. A description of an illustrative write-read cycle of operation will best be understood by first describing the manner in which flux orientations around the flux control apertures 19, 20, and 21 exercise control over the possible closure paths of a drive flux induced in the drive leg 15. In this connection, reference may be had to FIG. 2A where a portion of a cross leg 13 containing the flux control apertures 20 and 21 is shown slightly enlarged for purposes of description.

The proper control of an induced flux in the various legs and members of the structure 10 of the illustrative embodiment of FIG. 1 is determined by maintaining a limiting relationship between the minimum cross-sectional areas of those legs and members. Assuming that the plate structure 10 is of a uniform thickness throughout, then the dimension $d$, indicated in FIG. 2A, of each of the legs 11, 12, 13, 15, 16, and the legs of the U-shaped members 14, is maintained substantially constant at each point thereof. This dimension $d$ is determined as being at least equal to the sum of the dimensions $d'$ and $d''$ of the minor legs into which the cross legs 13 are divided by the flux control apertures 19, 20 and 21. A flux limited structure is thus presented which insures that a magnetic saturation of a cross leg 13 will also achieve a full magnetic saturation of the minor legs defined therein by the flux control apertures.

The portion of a cross leg 13 shown in FIG. 2A has threaded through the apertures 20 and 21 a single winding 29' which functions in the same manner as the windings $x_1$ and $x_2$ and the reset winding 29 threaded therethrough in the embodiment of FIG. 1, as will become apparent hereinafter. Considering now the magnetic states of the portion of a cross leg 13 shown in FIG. 2A, it is clear that a saturation flux, represented by the dashed lines $f$, entering at the left hand side of the cross leg 13 as viewed in the drawing, will divide on either side of the apertures 20 and 21 and pass along the cross leg via the minor paths on either side of the latter apertures. The portion of the cross leg 13 lying between the apertures 20 and 21 in this case will be magnetically neutral as represented in the drawing by the oppositely directed arrows of a closed flux loop. For purposes of representing such a magnetically neutral condition, such oppositely directed arrows will be employed in the structure 10 whenever such a condition obtains during an operative phase of the memory circuit. The saturation flux thus shown as existing in the portion of the cross leg 13 depicted in FIG. 2A, which flux occurs during both a write and read operation, may be assumed to find a closure path through other members of the plate structure 10 which path will be described in greater detail hereinafter.

In another magnetic flux situation in the cross leg 13 depicted in FIG. 2B, a current applied to the winding 29′ in the direction as represented by the arrows *i* induces a flux around each of the apertures 20 and 21 in the directions represented in the drawing by the closed flux loops around those apertures. The portion of the cross leg 13 lying between the latter apertures will be maintained in a saturated state downward as long as the current is applied. The upper minor legs will remain saturated in opposite directions as will the lower minor legs. As a result, the cross leg 13, in which a saturation flux previously existed as represented in FIG. 2A, will be reduced to an effectively neutral magnetic state as far as the magnetic effect on the operation of this invention is concerned. This follows, as will be appreciated by one skilled in the magnetic flux switching art, since the previous saturation flux will now be denied closure paths through the minor legs on either side of the apertures 20 and 21. The minor legs will be either already saturated or will be prevented from switching by the holding current applied to the winding 29′ as is clear from FIG. 2B. The portion of the cross leg 13 lying between the apertures 20 and 21 will be similarly prevented from switching, and thereby providing a closure path, by the same current in the winding 29′. The neutral magnetic condition of the cross leg 13 at both sides of the apertures 20 and 21 is represented in FIG. 2B by the oppositely directed arrows and dashed lines *f* in accordance with the conventions adopted in the foregoing. This neutral magnetic condition will be understood as continuing through the entire portion of the plate structure 10 which originally provided a closure path for the saturation flux in the cross leg 13 represented in FIG. 2A. This general neutral magnetic condition with respect to the remainder of the plate structure 10 is represented in connection with two of the storage members 14 and connecting cross leg 13 in FIG. 3. It will there be noted that each of the flux paths presented, both the major legs of a member 14 and the cross leg 13 and the minor legs into which portions of the cross leg 13 are divided by the flux control apertures 19, are reduced to a neutral magnetic state by the current applied to the winding 29′. The closed flux lines *f* serve to symbolize the neutral magnetic state in FIG. 3. It will be appreciated that the neutral magnetic states of all of the storage members thus shown will exist only in the absence of specific stored information bits. The saturation flux thus originally existing in the cross leg 13 and closure paths of the structure 10 may thus be understood as withdrawn from those paths by the current applied to the winding 29′. The foregoing flux reorientation operation will be referred to generally hereinafter in describing an illustrative cycle of operation of the embodiment of FIG. 1.

For purposes of describing such an illustrative cycle of operation it will be assumed that a binary word comprising the bits 1, 0, 1, 0 is to be written into the word row $r_3$ of the memory array. It will further be assumed that the entire structure 10 is in a magnetically neutral state such as that described and represented in connection with the portion of a cross leg 13 shown in FIG. 2B, and more specifically depicted in FIG. 3. Reference will further be had to FIGS. 1 and 4A through 4C in describing the illustrative cycle of operation. During the write phase a positive current pulse 40 is applied from the write pulse source 32 to the write drive winding 31. As a result of the field produced thereby, a write drive flux is induced in the drive leg 15 which is upward as viewed in the drawing. This write drive flux may be closed through a number of available paths as described in the foregoing, which paths may include any one of the cross legs $13_1$ through $13_4$. In accordance with one advantageous aspect of this invention, the word address selection is accomplished at the same time as the write drive flux is applied to serve as a writing medium. As was described in detail in connection with FIGS. 2A and 2B and the winding 29′ there shown as representative of either an address winding or a reset winding 29, an address selection current may be applied to an address winding $x_1$ or $x_2$ coupled to a particular cross leg 13 to effectively block this cross leg to a flux attempting to find closure therethrough. The latter address windings are shown in detail in FIG. 1 and by the application of the proper binary variable pulses to these windings, all save one of the cross legs $13_1$ through $13_4$ may be effectively blocked to the drive flux being induced in the drive leg 15. In accordance with the exemplary word row $r_3$ selected for this illustrative cycle of operation being described, the variables $x_1=0$ and $x_2=1$ are applied simultaneously with the current pulse 40 applied to the write drive winding 31. Thus, since the embodiment of FIG. 1 employs a double rail logic system in which an address winding is provided for a binary variable and also for its complement, it is evident that current pulses will in this manner be simultaneously applied to the address windings $x_1'$ and $x_2$ at this time with the result that the cross legs $13_1$, $13_2$, and $13_4$ will be blocked to the write drive flux. The gating action of the address windings with respect to each of the legs $13_1$ through $13_4$ is carried out in a manner described in detail in connection with FIGS. 2A and 2B. The cross leg $13_3$ is thus alone available as a closure path for the latter flux. The address code variables and their complements and the particular word row selected thereby are given in the following table:

| $x_1$ | $x_1'$ | $x_2$ | $x_2'$ | Word Row |
|---|---|---|---|---|
| 1 | 0 | 1 | 0 | $r_1$ |
| 1 | 0 | 0 | 1 | $r_2$ |
| 0 | 1 | 1 | 0 | $r_3$ |
| 0 | 1 | 0 | 1 | $r_4$ |

In accordance with a double rail logic system, it will be apparent from the table that, depending on the value of the variable, a current pulse is applied to either the winding corresponding to the variable or to the winding corresponding to its complement. As represented in the table in each case a "1" designates the occurrence of a current pulse and a "0" designates the absence of a current pulse.

Simultaneously with the write pulse 40 and coded address variables applied to the address windings, bit select current pulses are applied to selected column conductors 22 from the bit select switch 23. Positive current pulses 41 are thus applied in accordance with the exemplary word being written, to the column conductors $22_1$ and $22_3$. As will be apparent from the flux orientations depicted in FIG. 3, the current pulses 41 will have the effect, in the unselected cross legs 13, merely of causing a remanent flux to be induced around the apertures 19 of the information addresses in the columns of which the column conductors are energized since no write drive flux is being driven therethrough. As will appear hereinafter, these remanent fluxes so induced around the latter apertures 19 at this time will have no effect on information stored in the storage elements with which the latter apertures 19 are associated. In the selected cross leg $13_3$ these same remanent fluxes are induced around the apertures 19 associated with the storage elements of the selected word row appearing in the $c_1$ and $c_3$ columns in accordance with the information word being written. These remanent fluxes are symbolized in FIG. 4A by the dashed flux lines *f*. During the write phase being described, the write drive flux induced in the drive leg 15 by the current pulse 40 now has only the path represented by the cross leg $13_3$ available for closure. In the cross leg $13_3$ a path for this write saturation flux is provided on either side of the flux control apertures 20 and 21 since at this time no currents are being applied to the windings $x_1$ or $x_2'$ or the reset winding 29 threaded therethrough. However, at the first flux control aperture 19, one of the minor legs defined thereby is already saturated and the other minor leg is prevented from flux switching by the bit select current pulse 41 in the column conductor $22_1$. As a result, the write drive flux is diverted along the legs of the first U-shaped member 14 including the information storage leg thereof and then returns to the cross leg $13_3$. At the second element 14 no bit select current is being applied and the write drive flux is freely driven along the minor legs defined by the aperture 19 at this point. At the next succeeding member 14 the path through the cross leg $13_3$ is again blocked as was the case in connection with the first element 14 by the bit select current pulse 41 in the column conductor $22_3$. As a result, the write drive flux is again diverted through the information storage leg of that member 14. At the last storage element 14 the write drive flux is again free to pass along the minor legs defined by the flux control aperture 19 at that point. The write drive flux then closes along the side rail 12, the bridging piece 18, and the leg 16 of the flux drive member to the drive leg 15. At the termination of the write current pulse 40 and the bit select current pulse 41 a remanent flux will exist in the information legs of the storage members 14 in the columns $c_1$ and $c_3$, and the members 14 in the columns $c_2$ and $c_4$ will have the neutral magnetic state of the information legs thereof undisturbed. The remanent flux state of the exemplary cross leg $13_3$ is symbolized in FIG. 4A by the additional flux lines $f'$.

The next operative phase of the illustrative cycle of operation being described is a reset phase. At this time a negative reset current pulse 42 is applied from the reset pulse source 30 to the reset conductor 29 serially threading each of the flux control apertures 20 and 21 of each of the cross legs 13. This reset pulse will have the same magnetic effect on each of the cross legs 13 as was described in connection with the portion of a cross leg 13 depicted in FIG. 2B. That is, a remanent flux is induced around each of the flux control apertures 20 and 21 of the cross leg $13_3$ of the selected word row $r_3$ in the direction as represented by the dashed lines $f$ in FIG. 2B. These remanent fluxes effectively destroy the continuity of the write drive flux induced in the latter cross leg and the other members of the structure 10 specifically identified in the foregoing. As a result of the reset flux induced by the reset pulse 42, the structure 10 is reduced to magnetic neutrality except in the portions of the selected cross leg $13_3$ where flux closure paths are available within the limits of the latter cross leg. This is consistent with the conventions adopted for the flux limited nature of the cross legs in connection with the description of the portion of a cross leg 13 depicted in FIG. 2B. Thus, as a result of the flux reorientations due to the reset current pulse 42, a flux switching occurs in one of the minor legs defined by the aperture 19 at each of the information addresses containing a binary "1." The flux state of the selected cross leg $13_3$ is advantageously symbolized by the dashed flux lines $f$ in FIG. 4B. The binary word 1, 0, 1, 0, has thus been written into the word row $r_3$, as is represented in the information legs of the members 14 comprising the addresses of these bits, by a flux saturation state in the right hand direction as viewed in FIG. 4B and an effectively neutral state, respectively. The exemplary binary word thus written into the memory array of FIG. 1 may now be read out in a subsequent read phase of operation.

The particular word row selected for interrogation is determined in the same manner as that employed for the selection of a word row for writing purposes. That is, simultaneously with the induction of a drive flux in the drive leg 15, address code variable pulses are applied to the address windings $x_1$ and $x_2$ in accordance with the word row to be interrogated. For purposes of description it will be assumed that the information written into the memory array of FIG. 1 during the aforedescribed illustrative write and reset phases is now to be read out. Accordingly, the variables $x_1=0$ and $x_2=1$ are applied to the address windings of the cross legs 13. Of the latter cross legs, the legs $13_1$, $13_2$ and $13_4$ will thus again be blocked to a drive flux induced in the drive leg 15, leaving the cross leg $13_3$ the only available path for the drive flux. Simultaneously with the application of the address variable pulses to the address windings a positive read current pulse 43 is applied from the read pulse source 34 to the read drive winding 33. Since the sense of the winding 33 is opposite to that of the write winding 31, the read drive flux induced by the read pulse 43 will be in a direction opposite that of the write drive flux. The read drive flux will accordingly be driven along the drive leg 16 and side rail 12 to the selected cross leg $13_3$. At this point reference may again be had to the flux diagram depicted in FIG. 4B for an understanding of the flux reorientations resulting from the applied read drive flux. It will be apparent from the magnetic state of the first member 14, approaching from right to left as viewed in FIG. 4B, that, since each of the possible flux paths at this point is in a magnetically neutral state and is neither saturated nor held, the read drive flux readily finds a closure path through the shortest paths presented. The latter paths clearly are through the minor legs presented by the aperture 19 at this point. No flux switching thus occurs in the information storage leg of that member 14, which leg in its magnetically neutral state contains therein a binary "0." At the next succeeding member 14 from the right, however, the minor paths are already flux saturated and the read drive flux causes a flux switching in the diversionary path presented by the information leg of that member from a saturated flux state to one of magnetic neutrality. In its previously saturated state the information leg thus contained a binary "1."

The flux reorientations thus described for the members 14 continue for the remaining members found on the selected cross leg $13_3$. A flux switching occurs in each of the information storage legs containing a binary "1" with the magnetic state being left undisturbed where a binary "0" is stored. The resulting magnetic state of the cross leg $13_3$ and the information storage members 14 contained thereon after a read phase is symbolized in FIG. 4C by the dashed flux lines $f$. As a result of the flux switchings occurring in the information storage legs of the members 14 having binary "1's" contained therein, output signals indicative of these values are induced in the sensing conductors coupled to the members 14. Thus, output signals indicative of binary "1's" are induced in the sensing conductors $25_1$ and $25_3$ in accordance with the exemplary words written into the memory during the illustrative write phase previously described. These signals are transmitted to the information utilization circuits 26 via the detecting amplifier means 27 for consideration and use in the system of which the memory array may comprise a part. In the conventional manner, since no significant flux switchings occurred in the information storage legs of the members 14 containing binary "0's," no signals are induced in the sensing conductors $25_2$ and $25_4$. These signal conditions are also detected and passed on to the information utilization circuits 26.

One further operative phase advantageously restores the cross leg $13_3$ to a clear state thereby making available for subsequent write or read operations, a drive flux in the drive leg 15. Another reset current pulse 42 again breaks the continuity of the read drive flux remanently existing in the cross leg $13_3$ as was described in connection with FIG. 2B previously herein. When the read drive flux is thus withdrawn the magnetic state of the cross leg $13_3$ may be understood as being magnetically neutral as depicted in FIG. 3. The memory array of FIG. 1 is thus prepared for a subsequent write or read operation. Since the readout thus described is destructive, the leg $13_3$ is also in a clear magnetic state preparatory to having the same or different information restored therein.

A write or a read drive flux is thus advantageously employed as a medium for introducing into or erasing information from the memory. In this connection it is important to note that in either case, once the drive flux is withdrawn from a cross leg 13 by a resetting operation, the drive flux is immediately available for subsequent write or read operations without interference with information already stored in other word rows. It may further be noted that during a write phase when bit select current pulses 41 are applied to the selected column conductors 22, no disturbing effect can be had on information stored in the members 14 of unselected word rows. This may be readily demonstrated with reference to FIG. 4B and specifically to the members 14 containing binary "1's" therein. Since the bit select conductors 22 are inductively coupled to the lower minor legs at these members, the bit select current pulses 41 have only the effect of driving these minor legs further into magnetic saturation without causing a flux switching around the defining aperture 19.

One important advantage afforded by this invention is thus realized in that no upper limits appear for the bit select current pulses 41. Nor is such an upper limit imposed on the write or read current pulses 40 or 43. In another aspect the structure 10 also offers the important advantage of providing all closure paths for a drive flux as being equal in length as mentioned previously. The switching times for each of the paths through the cross legs 13 are thus equal and a substantial uniformity of output voltage signals is thus advantageously achieved. Further, the requirements of the holding current pulses comprising the address code variables are also relaxed by the equality of the cross leg 13 path lengths. The magnetomotive forces cross these paths are approximately equal at the time of flux switching and the holding currents accordingly need generate only sufficient magnetomotive force to keep the fields in the unselected cross legs 13 below the knee of the B-H loop and thereby steer the drive flux along a selected cross leg 13.

In the foregoing description of the organization and operation of aspecific illustrative embodiment of this invention, certain conventions with respect to the flux reorientations and switching in the various legs of the structure 10 were adopted for purposes of description. The actual internal physics of the legs during a flux switching operation, to the extent that it is presently known, will be appreciated as being considerably more complex. However, in a flux limited structure such as that described, the convention employed provides a consistent means for understanding the novel results obtained by this invention and is also sufficient for understanding the manner of its practice. Other schemes could as well have been employed to describe the flux reorientations during the operations of this invention. However, in view of the specific limitations imposed on the relative dimensions of the various legs and members of the structure 10 as set forth in the foregoing, discussion of the flux switchings in terms of assigned units or values of flux, for example, has been specifically avoided. One skilled in the magnetic switching art will be readily cognizant of the flux switching possible in the structure 10 in view of the dimensional limitations imposed.

The number of turns of the various windings and the particular senses in which the windings are coupled to the associated legs of the structure 10 are shown as being representative only. Thus, in each case these may be determined as dictated by the physical requirements of the memory array to be constructed. Similarly, it will be appreciated that energizing current pulses of polarities other than those shown and described may be employed for the operation of this invention.

In another specific embodiment of this invention shown in FIG. 5, an alternate geometry is provided for the individual information storage elements, which geometry permits a somewhat greater bit address capacity and a reduction in the size of the overall structure. One of the reset phases of operation may also be advantageously combined with a write phase to reduce the time of a write-read cycle. The embodiment of FIG. 5 also comprises a magnetic plate structure 50 apertured to present a plurality of flux steering legs in a substantially rectangular arrangement. The plate structure 50 is fabricated of a square loop ferrite material as was the plate structure 10 of the embodiment of FIG. 1 and is specifically apertured to present a pair of side rails 51 and 52 having a plurality of cross legs $53_1$ through $53_4$ transversely arranged therebetween. The details of only the cross leg $53_1$ are shown in the drawing as being sufficient, in view of the detailed description provided in connection with the embodiment of FIG. 1, for a complete understanding of this embodiment being described. The remaining legs $53_2$ through $53_4$ are represented by broken lines. The cross legs 53 are parallelly arranged and each of the cross legs 53 has a plurality of information storage elements 54 integrally formed therewith. Each of the storage elements 54 comprises three minor flux switching legs $u$, $v$, and $w$ arranged transversely to the cross legs 53. The minor flux switching legs $u$, $v$, and $w$ are connected at each of their ends by a bridging leg $y$ and $z$, respectively. Advantageously, the memory array of FIG. 5 is also word organized, the storage elements of a binary word being arranged in word rows along the cross legs 53, the binary bit addresses of the binary words being defined by the corresponding storage elements of the word rows. The rows and columns of information addresses are also designated $r_1$ through $r_4$ and $c_1$ through $c_4$, respectively, as was the case in the embodiment of FIG. 1.

The structure 50 also has a flux drive member comprising the drive legs 55 and 56 connected at diagonally opposite corners thereof by bridging leg pieces 57 and 58, respectively. The elements and legs of the structure 50 are also flux limited, that is, the minimum cross-sectional areas of these elements are maintained in a specific dimensional relationship. Specifically, the minimum cross-sectional areas of the side rails 51 and 52, each of the legs 53, drive legs 55 and 56, and bridging pieces 57 and 58 are substantially the same. The minimum cross-sectional area of each of the minor flux switching legs $u$ and $w$ and the briding legs $y$ and $z$ of the storage elements 54 are also maintained substantially equal, the cross-sectional area of the flux switching leg $v$ of a storage element 54 being at least twice the cross-sectional area of the other minor flux switching legs of a storage element 54. The cross-sectional area of each of the major flux paths presented by the cross legs 53, for example, are also maintained at least equal to twice the cross-sectional area of a minor flux switching leg such as $u$ or $w$ of a storage element 54.

Each of the cross legs 53 has a pair of small flux control apertures 60 and 61 therein located between the side rail 51 and the first column $c_1$ of storage elements. The flux control apertures 60 and 61 also divide the cross legs 53 at these points into minor flux legs, the cross-sectional area of each of which is also equal to the cross-sectional area of a minor leg $u$ or $w$ of a storage element 54.

Column conductors $62_1$ through $62_4$ associated with the columns of information addresses $c_1$ through $c_4$, respectively, thread the apertures defined by the minor legs $v$ and $w$ of the storage elements 54. The conductors 62 are each connected at one end to a bit select switch 63 and at the other end to a ground bus 64. Each of the storage elements 54 of the columns $c_1$ through $c_4$ also has threaded through the aperture defined by the minor legs $u$ and $v$ thereof a sensing conductor, which sensing conductors are shown in FIG. 5 as the column sensing conductors $65_1$ through $65_4$. The column sensing conductors 65 are each connected at one end to information utilization circuits 66 through a detection amplifier means 67 and at the other end to a ground bus 68. A reset conductor winding 69 is serially threaded in one direction through the aperture 61 and in the opposite direction through the aperture 60 of each of the cross legs 53 and is connected at one end to the ground bus 64. The reset conductor winding 69 is connected at the other end to a reset pulse source 70. A read drive winding 73, inductively coupled to the drive leg 55, is connected between ground and a read pulse source 74.

In addition to the reset conductor winding 69, each of the aperture pairs 60 and 61 of the cross legs 53 has threaded therethrough in a manner identical to that described for the embodiment of FIG. 1, a plurality of pairs of address windings. These address windings are also designated in accordance with the binary variables to be applied thereon as in the embodiment of FIG. 1. The address windings are also connected to pulse sources not shown in the drawing. The associated pulse sources and other circuitry shown only in block symbol form in the drawing, may also comprise circuitry well known in the art as mentioned in connection with the foregoing description of the embodiment depicted in FIG. 1.

A write-read cycle of operation of the embodiment of FIG. 5 is accomplished in two phases: a combined write-reset phase and a read phase. In a read phase a drive flux is induced in the drive leg 55, which drive flux is completed via the drive leg 56, the bridging piece 58, side rail 52, a selected one of the cross legs 53, side rail 51, and the bridging piece 57. In the selected cross leg 53 the drive flux is divided along the connecting members *z* and *y* in the storage elements 54, thereby causing flux switchings which will induce the output signals indicative of the binary bits stored in the selected word row storage elements. For purposes of describing an illustrative write-read cycle of operation of the embodiment of FIG. 5, it will be assumed that such a read flux was previously driven through the exemplary word row $r_1$ defined by the cross leg 53$_1$. It will further be assumed that the latter cross leg is to be selected for writing purposes and that the same binary word 1, 0, 1, 0 as was used for illustrative purposes in the embodiment of FIG. 1, is to be written into the exemplary word row. The same conventions with respect to the flux limited members of the embodiment of FIG. 1 will also be employed in the present description.

An illustrative write phase of operation of the embodiment of FIG. 5 may best be understood by reference to FIGS. 6A through 6C where are depicted in a slightly enlarged scale the cross leg 53$_1$ defining the exemplary word row $r_1$ and a general cross leg 53. As will become apparent hereinafter, an assumed previous read phase leaves the cross leg 53$_1$ and the storage elements 54 contained thereon in a magnetic state in which each of the closure flux paths for the read drive flux are remanently saturated in a right to left direction as viewed in the drawing. The saturated magnetic state is symbolized in FIG. 6A by the dashed flux lines *f*. The minor legs *v* of each of the storage elements 54 may be understood as being in a magnetically neutral state as represented by the closed flux lines indicated therein. Advantageously, in the embodiment of FIG. 5, the read drive flux is withdrawn and made available for a subsequent read operation by a reset, which reset also cooperates with bit select current pulses to accomplish the write operation. A negative reset current pulse 82, applied to the reset conductor winding 69 from the reset pulse source 70, causes a flux switching around the flux control apertures 60 and 61 in a manner identical to that described in connection with FIG. 2B. The resulting flux state around the apertures 60 and 61 is shown in FIG. 6B where the same cross leg 53$_1$ is depicted. In accordance with the flux closure convention adopted, the continuity of the read drive flux symbolized in FIG. 6A is broken and, as a result, each of the minor flux legs presented in the cross leg 53$_1$ as well as the major flux legs of the latter leg, are driven to a magnetically neutral state. Effectively, each of the latter members is thus driven to the threshold for switching in the opposite direction. Accordingly, if an additional magnetomotive force is applied to a storage element 54 contained on the cross leg 53$_1$ simultaneously with the reset current pulse 82, a closed flux loop comprising the minor legs *u, w, y,* and *z* may be remanently saturated in either direction depending on the direction of the applied force.

Such magnetomotive forces are applied to complete the write operation. Thus, simultaneously with the reset current pulse 82, positive bit select current pulses 83 are applied to the bit select conductors 62 associated with the bit addresses which are to contain binary "1's" and negative bit select current pulses 84 are applied to the bit select conductors 62 associated with the bit addresses which are to contain binary "0's". In accordance with the exemplary binary word 1, 0, 1, 0, to be written into the word row $r_1$, a positive bit select pulse 83 is applied to each of the bit select conductors 62$_1$ and 62$_3$. Negative bit select current pulses 84 are applied to the bit select conductors 62$_2$ and 62$_4$. In each of the storage elements 54 in which a binary "1" is to be stored, the positive bit select pulse 83 has the effect of preventing any change in the saturated state of the minor bridging leg *z* while at the same time causing a reversal of the saturated state of the bridging leg *y*. A remanent flux in the clockwise direction as viewed in the drawing is thus induced in each of these storage elements 54, which clockwise flux is representative of a binary "1" in the embodiment of FIG. 5. On the other hand, in each of the storage elements 54 in which a binary "0" is to be stored, the negative bit select pulse 84 has the effect of preventing any change in the saturated state of the minor bridging leg *y* while at the same time causing a reversal of the saturated state of the bridging leg *z*. A remanent flux in the counterclockwise direction as viewed in the drawing is thus induced in each of these storage elements 54, which counterclockwise flux is representative of a binary "0". These magnetic flux states are represented in FIG. 6B by the dashed flux lines *f* and *f′*, respectively. It will be appreciated that the portions of the cross leg 53$_1$ between the storage elements 54 are driven to magnetically neutral states as is also symbolized in FIG. 6B. With the completion of the foregoing flux reorientations in the cross leg 53$_1$, the exemplary binary word 1, 0, 1, 0, is now stored in the word row $r_1$.

A highly advantageous feature of the embodiment of FIG. 5 may now be pointed out. Since the reset current pulse 82 causes the minor legs *u, w, y,* and *z* of a storage element 54 to be driven toward the threshold of a complete flux switching, only a very small magnetomotive force is required to cause a complete flux switching around the loop defined by these minor legs. Thus, the bit select current pulses 83 and 84 need only be of sufficient magnitude to disturb the magnetic equilibrium of these minor legs. On the other hand, no upper limit is imposed on these current pulses and accordingly all of the problems attending the maintenance of critical current limitations are advantageously avoided in the embodiment of this invention depicted in FIG. 5.

During the foregoing illustrative write operation, it will be apparent that the bit select current pulses 83 and 84 are also being applied to the storage elements 54 of the other word rows $r_2$ through $r_4$. However, the magnetic states representative of the information bits stored in the latter elements 54 will be left effectively undisturbed during a write operation. Clearly the reset current pulse 82 can have no effect thereon since any flux switching in the cross leg 53 not selected for writing purposes has already been fully completed during previous writing operations. The effect of the bit select current pulses 83 and 84 on these unselected storage elements is to cause a flux switching in the minor legs, between which the bit select conductors 62 are threaded, where the bit select current pulse is opposite in polarity to the remanent magnetization of the storage element. Where the bit select current pulse is of the same polarity as the remanent magnetization of the storage element, the effect is merely to drive the element further into magnetic saturation. These magnetic effects may be more clearly understood by reference to FIG. 6C, where a portion of an unselected cross leg 53 having only the storage elements 54 containing a binary "1" and a binary "0," is depicted. Assuming that, in the worst case, a negative bit select current pulse 84 is applied to a storage element 54 containing therein a binary "1," the pulse 84 will have only the effect of switching the flux around the aperture defined by the minor legs $v$ and $w$ since the flux will tend to close around the path of least reluctance. The central minor leg $v$ will thus be saturated downward as viewed in the drawing. The direction of the remanent flux in the flux loop defined by the minor legs $u$ and $v$ and the connecting portions of the bridging legs $y$ and $z$, however, will remain undisturbed. These flux states are represented in FIG. 6C by the flux lines $f$ and $f'$. It is these portions of a storage element 54 which thus ultimately comprise the information storage cell since in these portions a magnetic state is left undisturbed by currents applied to other parts of the plate structure 50 during write operations. It is also through the aperture defined by the minor legs $u$ and $v$ through which a sensing conductor 65 is threaded as described hereinbefore.

Should, on the other hand, the storage element 54 already be in an information representative magnetic state to which the bit select current pulse tends to drive it, the result will be to leave the element 54 in the magnetic state obtaining after the initial write operation. This state is also shown in FIG. 6C by the flux lines $f''$. Bit select current pulses 83 and 84 applied to unselected storage elements 54 during a write operation thus cannot effectively disturb the remanent magnetic flux to which the sensing conductors 65 are linked.

It may be appreciated that, in the foregoing illustrative write operation, no word row selection step was required. Such a step is rendered unnecessary by the combined reset and bit selection operation. However, in this abbreviated mode of operation, a writing operation is accomplished in the word row which was interrogated during a previous read operation. Thus, the word row selection step is also advantageously combined with the selection of a word row for reading purposes. Such an illustrative read operation may now be described.

Although any word row may be selected for readout, for purposes of illustration it will be assumed that the word row $r_1$, chosen for an illustrative write operation, will also now be interrogated. The selection of the word row $r_1$ is accomplished in a manner identical to the selection of a word row in the embodiment of FIG. 1. Thus, in accordance with the table of address code variables previously provided herein, variable input pulses $x_1=1$ and $x_2=1$ are applied to the address windings threaded through the apertures 60 and 61 of each of the cross legs 53. As a result, all of the cross legs 53 except the cross leg $53_1$ will be blocked to a drive flux as explained in detail in connection with the embodiment of FIG. 1 with reference to FIG. 2B. At the same time as the application of the address code variable pulses to the address windings, a positive read current pulse 85 is applied from the read pulse source 74 to the read windings 73. As a result, a read drive flux is induced in the plate structure 50 and specifically in the cross leg $53_1$ as was described in connection with FIG. 6A. As this read drive flux is closed through the various minor legs of the storage elements 54 of the cross leg $53_1$ flux switchings will occur in particular minor legs thereof in directions which accord with the binary information stored in the elements 54.

Specifically, in a storage element 54 containing a binary "1," a flux switching in the portion of the bridging leg $y$ coupled to a sensing conductor 65 will occur in a right to left direction as viewed in the drawing. In a storage element 54 containing a binary "0" such a flux switching in the portion of the bridging leg $z$ will occur. By threading the sensing conductors 65 as indicated in FIG 5, each of the conductors 65 is coupled to the bridging legs $y$ and $z$ in opposite senses. Accordingly, signals of opposite polarity will be induced in the sensing conductors 65 for the two binary bits stored in an interrogated word row. Specifically, in the illustrative read operation being described, in view of the particular sense of coupling of the sensing conductors 65 shown in FIG. 5, negative output signals indicative of the interrogated binary "1's" will be induced in the sensing conductors $65_1$ and $65_3$ and positive output signals indicative of the interrogated binary "0's" will be induced in the sensing conductors $65_2$ and $65_4$. These output signals, which are indicative of the exemplary binary word stored in the interrogated word row $r_1$ are transmitted via the detection amplifier means 67 to the information utilization circuits 66 for consideration by the system of which the memory array may comprise a part. The resulting magnetic state of a cross leg 53 after a read operation is that symbolized in FIG. 6A. This magnetic state is also the control which selects the cross leg 53 for a subsequent write operation as described previously herein.

In describing the embodiments of FIGS. 1 and 5, a four-by-four memory array was assumed and shown in each case. However, it is to be understood that memory arrays of a greater capacity may also be constructed in accordance with the principles of this invention and the particular embodiments have been selected for illustrative purposes only. Each of the embodiments of this invention described in the foregoing advantageously lends itself to the ready fabrication of multiplane memory arrays in which a number of the apertured plate structures are stacked in a substantially congruent arrangement. In this manner the use of common drive and other windings becomes possible. The advantages of combinations of the structure described will readily present themselves to one skilled in the magnetic switching art.

What have thus been described are considered to be only illustrative embodiments of this invention and various and numerous other arrangements may be devised by one skilled in the art without departing from the spirit and scope thereof.

What is claimed is:

1. A magnetic memory array comprising a rectangular plate of a magnetic material having substantially rectangular hysteresis characteristics, said plate being apertured to present a pair of side rails having a plurality of transverse cross legs therebetween, each of said cross legs having a plurality of information bit addresses defined thereon, the portion of a cross leg comprising a bit address having a plurality of flux legs therein, one of said flux legs comprising an information storage leg, said plate also being apertured to present a flux drive member, a plurality of closed flux loops being presented through said drive member and said plurality of cross legs, means for inducing a write drive flux in one direction in said drive member, first inductive means for blocking all except a selected one of said cross legs to said write drive flux, and a plurality of second inductive means for selectively steering said write drive flux to selected information storage legs of said selected cross leg to set said last-mentioned storage legs to one magnetic state representative of particular binary bits.

2. A magnetic memory array as claimed in claim 1 also comprising a third inductive means for withdrawing said write drive flux from said selected cross leg.

3. A magnetic memory array as claimed in claim 1 also comprising means for inducing a read flux in the opposite direction in said drive member and means including sensing windings coupled to said information storage legs of said selected cross leg energized responsive to flux switching in said last-mentioned storage legs for generating output signals indicative of said particular binary bits.

4. A magnetic memory array as claimed in claim 1 in which each of said cross legs has a pair of gating apertures therein and said first inductive means comprises a plurality of pairs of address windings, each pair threaded in one and the opposite direction through a pair of said gating apertures, respectively, and means for applying coded input currents to said plurality of pairs of address windings.

5. A magnetic memory array comprising a rectangular plate of a magnetic material having substantially rectangular hysteresis characteristics, said plate being apertured to present a pair of side rails having a plurality of transverse cross legs therebetween, each of said cross legs having a plurality of information bit addresses defined thereon, said plate also being apertured to present a flux drive member, a plurality of closed flux loops being provided through said drive member and said plurality of cross legs, means for inducing a write drive flux in one direction in said drive member, first inductive means for blocking all except a selected one of said cross legs to said write drive flux, said selected cross leg having a flux bypass member at each of said information bit addresses, each of said bypass members including an information storage leg, a plurality of second inductive means for selectively steering said write drive flux to selected information storage legs of said selected cross leg to set said last-mentioned storage legs to one magnetic state representative of particular binary bits, means for subsequently inducing a read drive flux in the opposite direction in said drive member, and means including sensing windings coupled to said bypass members energized responsive to flux switchings in said last-mentioned members for generating output signals indicative of said particular binary bits.

6. A magnetic memory array as claimed in claim 5 in which said flux drive member is integral with said plate at opposite diagonal corners thereof, said drive member, said side rails, and said cross legs being arranged so that said plurality of closed flux loops are substantially equal in length.

7. A magnetic memory array as claimed in claim 6 in which said flux drive member comprises a substantially L-shaped structure having legs running substantially parallel with one of said side rails and an end one of said cross legs, respectively.

8. A magnetic memory array as claimed in claim 5 in which each of said bypass members comprises a substantially U-shaped structure and in which said plurality of second inductive means includes a plurality of control windings coupled to said selected cross leg between the legs of said U-shaped structures, respectively.

9. A magnetic memory array as claimed in claim 8 in which said selected cross leg has a plurality of flux control apertures therein between said legs of said U-shaped structures, respectively, and in which said plurality of control windings respectively thread said plurality of flux control apertures.

10. A magnetic memory array comprising a plurality of magnetic storage elements arranged in rows and columns, each of said storage elements being of a material having substantially rectangular hysteresis characteristics and each of said storage elements having a first aperture therein, said first apertures dividing each of said elements into an information storage leg and a bypass leg, a plurality of magnetic cross leg means for magnetically connecting the bypass legs of each of the storage elements of each of said rows in series, a pair of magnetic side rail means for magnetically connecting the ends of said cross leg means in parallel, a flux drive member magnetically connected to one end of one of said cross leg means and to one end of one of said pair of side rail means and also magnetically connected to the other end of the other end one of said cross leg means and to the other end of the other of said pair of side rail means, write drive means including a write drive winding coupled to said flux drive member, word address selecting means including a plurality of address windings coupled respectively to said plurality of cross leg means at an address portion thereof between said one of said pair of side rails and the first column of storage elements, a plurality of column write circuits associated respectively with said columns of storage elements each including a plurality of write windings coupled respectively to the bypass legs of the storage elements of the associated column of storage elements, and a plurality of column sensing circuits associated respectively with said columns of storage elements each including a plurality of sensing windings coupled respectively to the storage elements of the associated columns of storage elements.

11. A magnetic memory array as claimed in claim 10 in which each of said storage elements has a second aperture in the bypass leg thereof and in which said write windings are threaded respectively through said second apertures.

12. A magnetic memory array as claimed in claim 11 in which each of said cross leg means has a pair of flux control apertures in the address portion thereof and in which said plurality of address windings comprises pairs of windings threading respectively one aperture of said pairs of flux control apertures in one direction and the other of said pairs of flux control apertures in the other direction, said word selecting means further including means for applying binary coded address signals to said pairs of windings.

13. A magnetic memory array as claimed in claim 11 also comprising reset means including a reset conductor threading each of said pair of flux control apertures of each of said cross legs means.

14. A magnetic flux control device comprising a plurality of magnetic core elements each of a material displaying substantially rectangular hysteresis characteristics, each of said core elements presenting a plurality of discrete flux legs including an information storage leg and a bypass leg, said core elements being arranged in a plurality of groups, a plurality of magnetic connecting means for magnetically connecting the bypass legs of the core elements of respective groups of core elements in series, first inductive means for selectively blocking the magnetic connecting means of all except one of said groups to an induced flux, a plurality of second inductive means associated with each of said groups for selectively blocking said bypass legs to an induced flux and diverting said induced flux to said storage legs, a flux drive member means integral with said plurality of magnetic connecting means, and means for inducing a write drive flux in one direction in said flux drive member means.

15. A magnetic flux control device as claimed in claim 14 also comprising means for subsequently inducing a read drive flux in the opposite direction in said flux drive member means and sensing means coupled to said core elements for detecting flux reversals in the storage legs of said core elements.

16. A magnetic flux control device as claimed in claim 15 in which each of said plurality of second inductive means comprises a selecting winding coupled to a bypass leg of a core element, said control device also comprising a plurality of core select circuits each serially including the selecting winding of a particular core element of each of said plurality of groups.

17. A magnetic flux control device as claimed in claim 16 in which said sensing means comprises an individual sensing winding coupled to each of said core elements, said control device further comprising a plurality of sensing circuits each serially including the sensing windings of corresponding particular core elements of each of said plurality of groups.

18. A magnetic memory array comprising a plate of a magnetic material having substantially rectangular hysteresis characteristics, said plate being apertured to present a pair of side rails having a plurality of transverse cross legs therebetween, each of said cross legs having a plurality of information bit addresses defined thereon, each of said bit addresses comprising a plurality of secondary flux legs formed on the cross leg, particular ones of said secondary flux legs defining an information storage cell, said plate also being apertured to present a flux drive member, a plurality of first inductive means coupled respectively to said cross legs, means for selectively energizing said plurality of first inductive means for blocking all except a selected one of said plurality of cross legs to a drive flux, second inductive means coupled to said flux drive member for inducing a read drive flux in said drive member, said read drive flux being closed through said selected cross leg and said particular ones of said secondary flux legs thereon to cause flux switchings therein in accordance with information bits stored in the information storage cells defined thereby, and sensing winding means coupled to said particular ones of said secondary flux legs of said selected cross leg energized responsive to said flux switchings for generating output signals indicative of said particular information bits.

19. A magnetic memory array as claimed in claim 18 also comprising means for restoring information bits to the storage cells of said selected cross leg comprising means for subsequently re-energizing said plurality of first inductive means for again blocking all except said selected one of said cross legs to a drive flux, third inductive means coupled to said drive member for inducing a write drive flux in said drive member in a direction opposite to that of said read drive flux, said write drive flux being closable through said selected cross leg and said particular ones of said secondary flux legs thereon, a plurality of bit select windings coupled respectively to the secondary flux legs of the information storage cells defined on said selected cross leg, and means for selectively energizing said bit select windings in accordance with particular information bits for controlling said write drive flux in the secondary flux legs of particular storage cells.

20. A magnetic memory array as claimed in claim 18 also comprising means for restoring information bits to the storage cells of said selected cross leg comprising means for subsequently re-energizing the particular first inductive means coupled to said selected cross leg for driving said selected cross leg and the secondary flux paths formed thereon to a threshold of flux switching, a plurality of bit select windings coupled respectively to the secondary flux legs of the information storage cells defined on said selected cross leg, and means for selectively applying current pulses of one and the opposite polarity to said bit select windings simultaneously with said re-energizing of said first inductive means in accordance with particular information bits for inducing remanent fluxes in the secondary flux paths of said storage cells in one and the opposite direction representative of said particular information bits.

21. A magnetic memory array comprising a rectangular plate of magnetic material having substantially rectangular hysteresis characteristics, said plate being apertured to present a pair of side rails having a plurality of transverse cross legs therebetween, each of said cross legs having a plurality of information bit addresses defined thereon, the portion of a cross leg defining a bit address comprising a magnetic element having a first and a second aperture therein, said first and second apertures defining a plurality of minor flux legs, said plate also being apertured to present a flux drive member, a plurality of closed flux loops being presented through said drive member and said plurality of cross legs, first inductive means for blocking all except a selected one of said cross legs to a drive flux, means for inducing a read drive flux in said drive member for clearing each of the elements of said selected cross leg, and write means including said first inductive means and a plurality of bit select conductors threading respectively the second apertures of said information storage addresses for inducing remanent magnetizations of one and the opposite directions in the magnetic elements of said selected cross leg representative of one and the other binary information bits.

22. A magnetic memory array as claimed in claim 21 also comprising a plurality of sensing conductors threading respectively the first apertures of said information storage addresses energized responsive to flux switchings caused in said magnetic elements by said read drive flux for generating output signals indicative of binary information bits stored in information bit addresses of said selected cross leg.

23. A magnetic memory array as claimed in claim 22 in which the minimum cross-sectional area of each of the flux paths around said first and second apertures of said magnetic elements is substantially half the minimum cross-sectional area of a flux path presented by any one of the cross legs, side rails, and flux drive member.

24. A magnetic core element comprising a one-piece structure of a magnetic material having substantially rectangular hysteresis characteristics, said structure being apertured to present a plurality of first flux legs connected together at each end respectively by a pair of side rails and a second flux leg, all of said legs and side rails being equally flux-limited and said second flux leg being connected at its ends with said pair of side rails respectively at points such that the closed flux paths through said second flux leg and each of said first flux legs are substantially equal in length.

References Cited in the file of this patent

UNITED STATES PATENTS

| | | |
|---|---|---|
| 2,923,923 | Baker | Feb. 2, 1960 |
| 2,963,591 | Crowley et al. | Dec. 6, 1960 |
| 2,987,625 | Mallery | June 6, 1961 |